United States Patent
Gandhi et al.

(10) Patent No.: US 6,618,598 B1
(45) Date of Patent: Sep. 9, 2003

(54) FORWARD RATE DETERMINATION OF HIGH DATA RATE CHANNELS IN CDMA AIR INTERFACE

(75) Inventors: Asif D Gandhi, Springfield, NJ (US); Raafat E Kamel, Little Falls, NJ (US); Andrew R Kostic, Lincoln Park, NJ (US); Alexandro Salvarani, Edison, NJ (US); Mathew Thomas, Scotch Plains, NJ (US); Stanley Vitebsky, Parsippany, NJ (US); Carl Francis Weaver, Township of Hanover, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/676,179

(22) Filed: Sep. 29, 2000

(51) Int. Cl.[7] .................................................. H04B 7/00
(52) U.S. Cl. ..................... 455/522; 455/69; 370/332; 370/333
(58) Field of Search .................... 455/522, 69, 442; 370/332, 333

(56) References Cited

U.S. PATENT DOCUMENTS

| | | | |
|---|---|---|---|
| 5,487,180 A | 1/1996 | Ohtake | 455/54.1 |
| 5,634,195 A | 5/1997 | Sawyer | 455/54.1 |
| 5,771,461 A | 6/1998 | Love et al. | 455/522 |
| 6,088,578 A * | 7/2000 | Manning et al. | 455/68 |
| 6,167,270 A * | 12/2000 | Rezaiifar et al. | 455/442 |
| 6,272,124 B1 * | 8/2001 | Ahn et al. | 370/342 |
| 6,285,886 B1 * | 9/2001 | Kamel et al. | 455/522 |

OTHER PUBLICATIONS

European Search Report.

* cited by examiner

Primary Examiner—Dwayne Bost
Assistant Examiner—Sujatha Sharma

(57) ABSTRACT

A method for determining the initial power to be allocated to a secondary channel having a desired data rate. An SNR setpoint is first calculated where such setpoint is based on the SNR setpoint of the associated primary channel and system offset values. The initial power is then calculated based on the calculated setpoint.

4 Claims, 1 Drawing Sheet

FORWARD RATE DETERMINATION OF HIGH DATA RATE CHANNELS IN CDMA AIR INTERFACE

BACKGROUND OF THE INVENTION

1. Field of the Invention

The present invention is generally related to a method for determining the amount of resources to be allocated to a forward link secondary channel over the air interface.

2. Description of the Related Art

Communication systems, and in particular, wireless communication systems comprise a plurality of communication links through which subscribers of such systems communicate with each other and with subscribers of other communication systems. Wireless communication systems such as Code Division Multiple Access (CDMA) systems and other communication systems have an air interface through which communication signals between a subscriber and the system are exchanged (i.e., transmitted and/or received). A subscriber exchanges communication signals over the air interface with a base station that serves a particular geographic region known as a cell. A base station generally comprises radio equipment and processing equipment to allow communication with subscribers located within the cell. Typically, wireless communication systems comprise a plurality of cells, each of which has at least one base station that serves subscribers located within the cell. The air interface for each subscriber comprises two communication channels: a forward channel and a reverse channel. In the forward channel, signals from the base station are transmitted to a subscriber. Conversely, a subscriber uses the reverse channel to transmit signals to the base station of the cell within which such subscriber is located.

Many wireless communication systems communicate to a subscriber over a set of links from different base stations. The set of links is referred to as a primary channel. In many cases, however, the primary channel comprises only one link. The use of a set of links for a subscriber enables the system to select the best link for a particular instant of time and use that link to communicate with the subscriber. The best link is typically a communication link with the best quality of service (QoS). The QoS is typically a function of network variables that reflect the quality of a link. One example of such a network variable is the Frame Error Rate (FER). In CDMA systems and other wireless systems signals are transmitted as frames where each frame is a block of bits. When a frame is received with at least one error, it is said to be an error frame. The FER is the ratio of the number of error frames received to the total number of frame received during a defined period of time. Thus the communication system is able to communicate with a subscriber through a primary channel comprising at least one communication link. The communication system designates the link—from the set of links—which has the most favorable conditions (e.g., lowest FER)—for communication as the anchor leg. Accordingly, most of the time most of the communication between a subscriber and the system is done through the anchor leg.

Many communication systems now allow subscribers to have simultaneous access to more than one channel. A subscriber, while using a primary channel, may request a secondary channel. For example, a subscriber using the primary channel for low speed data may want to have access to a secondary channel to run additional applications at higher data rate throughput. Communication signals associated with the additional applications would then be exchanged over the secondary channel. In a multi-link primary channel, the anchor leg is usually selected for the secondary channel. However, prior to granting a subscriber access to the secondary channel, the communication system first assesses the subscriber's resource requirements and then determines whether the required resources are available. The resources are the various communication assets such as the number of radios available from the selected link, the amount of power available per link, the bandwidth available per link and maximum information rate supportable at each link. The information rate and the amount of power supportable for transmission at a particular link are two critical resources whose usage system providers desire to apply in a most efficient manner.

Prior to providing a requesting subscriber access to a secondary channel, the communication system determines whether the secondary channel can support the information rate being requested by the subscriber. Some secondary channels support only one information rate, while other secondary channels support multiple data rates. If the secondary channel supports one information rate, the system determines whether there is sufficient power to transmit information at that rate. If the secondary channel supports multiple information rates, the system determines the best information rate based on the amount of power available and the RF conditions. Further, the communication system has to determine the amount of initial power it is to allocate to the secondary channel.

Most wireless communication systems perform some sort of power control technique so as to use their power efficiently. In many such techniques, the power made available to each primary channel is continually adjusted to compensate for changing system conditions. Communication system providers (i.e., owners and operators of communication system equipment) want to avoid circumstances where too much power is routed to one or a group of subscribers while other subscribers cannot gain access to the system because of insufficient power. The radio equipment at the base stations are thus controlled on a system wide basis to maintain a relatively efficient use of power throughout the system.

Typically the communication system allows the secondary channel to use a subset of the connections used by the primary channel. For example, the primary channel is in three way soft hand off with three base stations, while the communication system assigns a secondary channel to the same user from one of the links from the set of links that make up the primary channel. In general the communication system would assign a subset of the primary channel active connections to the secondary channel in order to reduce the network equipment resources needed to support the secondary channel connection. The most efficient method is to use only one connection for the secondary channel; usually the anchor leg.

In principle the transmitted power of each primary channel connection is the same, even if it changes in time and the path loss of each of the connections is different. Lack of knowledge of the path loss imbalance among the connections of the primary channel introduces errors in the estimate of the initial power required by the secondary connection; this is especially true when the secondary channel uses a subset of the primary channel connections. When only one link is being used for the secondary channel, error in the estimate of the initial power is critical because there is no diversity gain in the secondary channel. Diversity gain refers to a multi-link channel where information can be exchanged in any one of the links; that is, there are alternative links for exchanging information. A secondary channel having only one link has no alternative; it thus becomes critical that the one link operate satisfactorily in order to avoid relatively high FER.

An error in the estimate of the secondary channel initial power would introduce inefficiencies that impair the performance of the communication system. For example, if the system underestimates the amount of initial power it allocates to the secondary channel, the usage of the secondary channel may not last long enough for the power control technique being used to adjust to the correct amount of power for acceptable communications. In such a case, the initial power estimate is too low and the result is a relatively high FER. The system would then increase the power at some later time so as to reduce the FER, but at that point the communications over the secondary channel may have been terminated by the subscriber. Conversely, the system may have allocated too much initial power or a high value of the Signal to Ratio (SNR) setpoint to the secondary channel which results in the system not allowing access to other requesting subscribers because there is relatively little power remaining. Under these circumstances the power control technique being used should restore the correct secondary channel power level. However, when the duration of transmission of the secondary channel is short and the initial value of the power or the SNR setpoint is too high, the power control technique being used does not have the time to converge to the best values. In this case the service provider will use excessive power for the whole duration of the secondary channel transmission.

In these cases, the power control technique used by the system was not helpful because the initial power estimate for the secondary channel was not a sufficiently accurate estimate of the actual initial power requirement.

What is therefore needed is an algorithm that provides a relatively accurate estimate of the amount of initial power and SNR setpoint to be made available to a secondary channel to allow a communication system to perform power control techniques on the secondary channel enabling the communication system to use its power efficiently.

SUMMARY OF THE INVENTION

The present invention provides a method for determining a relatively accurate value for the initial power and initial SNR setpoint to be allocated to a secondary channel of a wireless communication system operating at a certain information rate. The method first calculates an initial SNR setpoint based on the SNR setpoint of an associated primary channel and system offset values. The calculated SNR setpoint, the information rate of the secondary channel and primary channel system parameters are then used to calculate the initial transmission power level for the secondary channel. The initial transmitted power of the secondary channel is calculated so that its value and variance are both within thresholds set by the service provider of the communication system.

DETAILED DESCRIPTION

Figure 1:
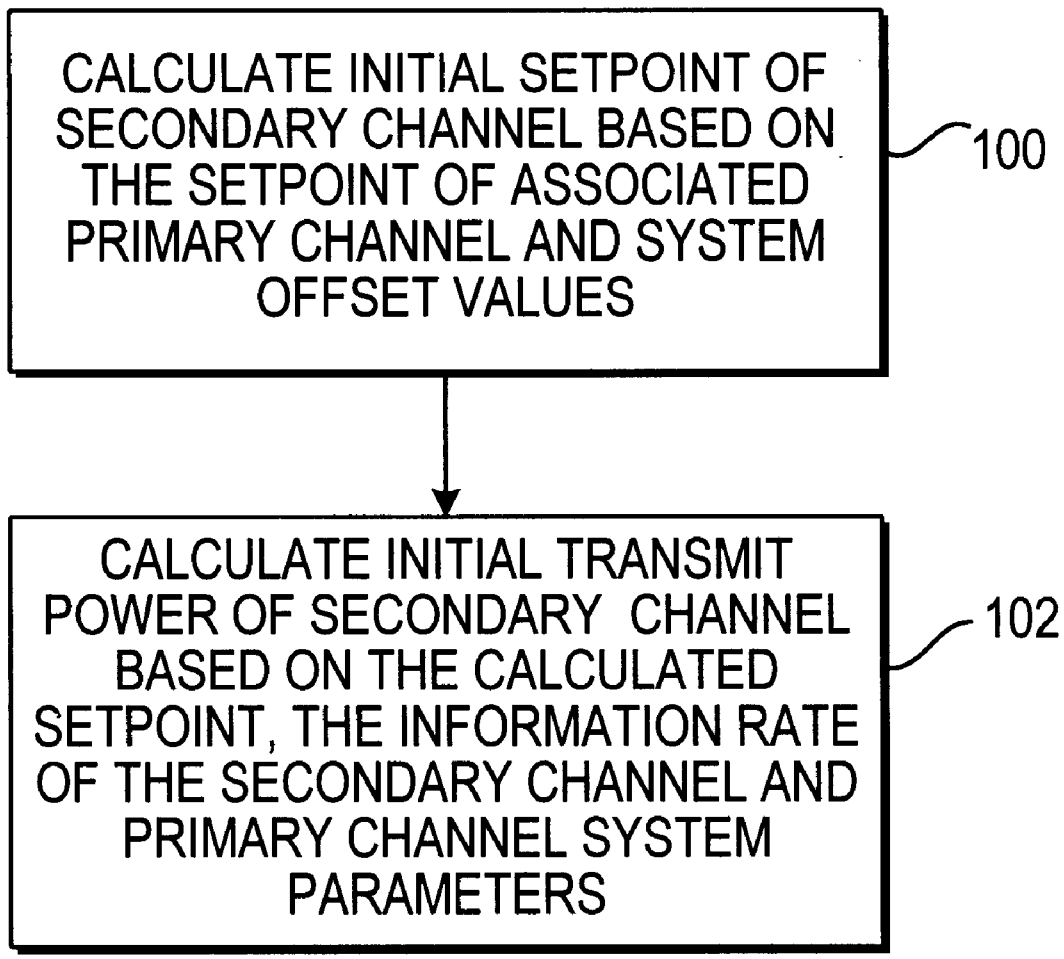
FIG. 1 depicts the method of the present invention.

The present invention provides a method for determining a relatively accurate value for the initial transmitted power and SNR setpoint to be allocated to a secondary channel of a wireless communication system operating at a certain information rate that is supportable by the air interface. The method first calculates an initial SNR setpoint for the secondary channel based on the SNR setpoint of an associated primary channel and system offset values. The calculated SNR setpoint, the information rate and primary channel system parameters are then used to calculate the initial transmitted power and SNR setpoint for the secondary channel. The initial transmitted power of the secondary channel is calculated so that its value and variance are within thresholds set by the service provider of the communication system. The method of the present invention will be described for a forward secondary channel. For clarity of explanation the term "subscriber" will be used interchangeably with the terms "mobile station" or "mobile" in describing the various aspects of the method of the present invention. For ease of explanation, the method of the present invention is explained in the context of a CDMlA communication system. It will be readily understood, however, that the method of the present invention is not at all limited to CDMA systems.

The SNR of the primary channel is the measured ratio of the energy of the information to the energy of all other signals that is not the information being transmitted or received. The SNR for the primary channel is represented as where $E_b^{PR1}$ is the bit energy of the primary channel measured for a particular subscriber (or mobile station) and $N_1$ is the effective noise power spectral density measured for the subscriber. Initially a subscriber is using the system and is communicating over the communication system through the use of a primary channel comprising one or several communication links. At some point, the subscriber makes a request for a secondary channel. The secondary channel is selected from a set of links representing the primary channel. If the primary channel has one link, the secondary channel uses part of that link. One or more of the links of the primary channel is used for the secondary channel; the primary channel is thus associated with the secondary channel.

In step 100 of the method of the present invention, the system calculates an SNR setpoint for the secondary channel based on the SNR setpoint of the corresponding primary channel and several system offset values. The SNR setpoint for the primary channel is estimated at the base station or it can be measured by a mobile within the cell being served by the base station and the value is transmitted to the base station as part of signaling information being exchanged between the base station and mobiles within the cell. The secondary channel setpoint SNR is calculated as per the following equation:

$$\left(\frac{E_b^{SEC}}{N_t}\right) = \left(\frac{E_b^{PRI}}{N_t}\right) + (\text{sector\_offset}) + (\text{user\_offset}) + (\text{rate\_offset}) \quad (1)$$

The sector_offset is a correction factor evaluated by base station equipment for each sector of the cell being served by the base station; this system offset value takes into account the diversity gain of the secondary channel relative to the primary channel plus the difference in forward target FER between the two channels. The target FER is a desired FER usually set by the subscriber; it can also be set by the service provider. One example of calculating the sector_offset is to have a multi-dimensional array where each element of the array is a sector_offset value indexed by power ratio measurements determined in terms of the mobile measurements of $$\left(\frac{E_C}{I_O}\right)_{MS}$$

of the full active set (i.e., total number of links assigned to a channel) of the primary channel and the pilot load, $$\left(\frac{E_C}{I_{OR}}\right)_{BS},$$

of the full active set of the primary channel.

In particular, the sector_offset value can be obtained from a table indexed by mobile power ratio measurements $$\left(\text{i.e.}, \left(\frac{E_C}{I_O}\right)_{MS}\right)$$

and base station power ratio measurements $$\left(\text{i.e.}, \left(\frac{E_C}{I_{OR}}\right)_{BS}\right).$$

The obtained sector_offset value indexed by the power ratio measurements is modified based on measurements of the FER of the secondary channel of users in the sector. These measurements of the FER of subscribers in the sector are collected by the mobiles in the sector and reported to the base station equipment as part of signaling information being exchanged between the mobiles and the base station within the cell. It should therefore be noted that the sector_offset values in the table are the results of previous secondary channels that are not active. The definition of the power ratios is as follows:

$$\left(\frac{E_C}{I_{OR}}\right)_{BS}$$

is the ratio of forward pilot energy to total CDMA power-.spectral density transmitted by the base station in sector i where i is an integer equal to 1 or greater and $$\left(\frac{E_C}{I_O}\right)_{MS}$$

is the ratio of forward pilot chip energy of sector i to the total received power spectral density as measured at the mobile station. The pilot is a reference signal transmitted by the station for implementing power control techniques and other system functions.

The user_offset is another correction factor for the SNR setpoint for the secondary channel. The user_offset is initially set to zero at the beginning of communications between a subscriber and the base station. The user_offset is maintained for each user in a sector by the base station and is based on the measurements of the FER of the secondary channel and the forward pilot power ratio measured at the mobile $$\left(\text{i.e.}, \left(\frac{E_C}{I_O}\right)_{MS}\right).$$

The user_offset is thus obtained by the method of the present invention in order to calculate the secondary channel setpoint SNR.

The rate_offset is a fixed offset that takes into account the received signal power level at a mobile station due to different target FER among users and different SNR setpoints due to the different information rates available to the mobile for the secondary channel. The service provider assigns a rate_offset for each information rate supported by the secondary channel. The rate_offset is obtained by the method of the present invention in order to calculate the secondary channel setpoint SNR.

In step 102, the resulting setpoint value of the secondary channel calculated from equation(1) is used to determine the initial transmission power level for the secondary channel by using the following equation:

$$\left(\frac{E_{Ci}^{SEC}}{E_{Ci}^{P}}\right)_{BS} = \left(\frac{R}{W}\right) \times \left(\frac{E_b^{SEC}}{N_t}\right) \times \left[\left(\frac{\left(\frac{E_{Ci}^{P}}{I_{OR}}\right)_{BS}}{\left(\frac{E_{Ci}^{P}}{I_O}\right)_{MS}} - 1\right) \times \left(\frac{E_{Ci}^{P}}{I_{OR}}\right)_{BS}^{-1} + \left(O_{LOSS} \times \frac{\text{ADMIT\_THRESHOLD} \times I_{OR}}{E_{Ci}^{P}}\right)\right] \quad (2)$$

where $$\left(\frac{E_{Ci}^{SEC}}{E_{Ci}^{P}}\right)_{Bs}$$

is the ratio of chip energy of secondary channel to chip energy of forward pilot channel in sector i. The variable R is the desired data rate of the secondary channel and W is the bandwidth of the CDMA carrier for both primary and secondary channels. A chip is a basic timing period used in transmitting information in CDMA communication systems. The variable $O_{Loss}$ represents the orthogonality loss due to interference of other mobiles in the same sector. In CDMA communication systems, a set of orthogonal signals is transmitted in each cell where each of the orthogonal signals is associated with a particular subscriber. The loss that is measured is the result of interference between the orthogonal signals. The initial transmit power of the secondary channel is thus based on the calculated setpoint, the information rate of the secondary channel and primary channel system parameters such as $O_{Loss}$ and power ratio measurement for the primary channel, i.e., $$\left(\frac{E_{Ci}^{P}}{I_{OR}}\right)_{BS} \text{ and } \left(\frac{E_{Ci}^{P}}{I_O}\right)_{MS}.$$

The ADMIT_THRESHOLD variable represents a percentage of the maximum forward amplifier power level. The forward amplifier is used to transmit signals over the primary and secondary forward channels. The ADMIT_THRESHOLD is selected by the service provider. Information will be exchanged over the secondary channel at a particular rate usually requested by the subscriber. Some secondary channels only support one information rate while others support a set of standard information rates. When the forward power amplifier is operating near its capacity, the signals amplified and transmitted by such an amplifier may become distorted.

To reduce the possibility of distortion, and also determine if the desired information rate is achievable, the calculated initial transmit power of the secondary channel is required to meet two conditions. The first condition is that $E_{Ci}^{SEC}<$ (ADMIT_THRESHOLD× current maximum transmit power) where the current maximum transmit power refers to the power of the forward amplifier. The forward amplifier is the amplifier or the set of amplifiers used to transmit signals in a forward channel. The second condition is $E_{Ci}^{SEC}$ (1+VARIANCE_THRESHOLD)<(MAX_POWER_ THRESHOLD× current maximum transmit power) where VARIANCE_THRESHOLD and MAX_POWER_ THRESHOLD are values selected by the service provider. The selected values allow the secondary channel transmit power to be maintained within a certain range. If the two conditions are met, then the secondary channel can operate at information rate R. The initial transmit power value for any other value of R is determined in the same manner as discussed above. Once the initial transmit forward secondary channel power is determined, the system adjusts the transmit power according to it power control technique.

We claim:

1. A method for determining an initial power value for a secondary channel of a communication system, the method comprising:

calculating an SNR setpoint for the secondary channel based on system offset values and an SNR setpoint of an associated primary channel; and calculating the initial power value based on the calculated SNR value and a desired information rate for the secondary channel and system parameters of the associated primary channel.

2. The method of claim 1 where the system offset values are a sector_offset, a user_offset and a rate_offset.

3. The method of claim 1 where the step of calculating the initial power value further comprises comparing the calculated initial power value to power level threshold values of the secondary channel to determine if the desired information rate is achievable.

4. The method of claim 1 where the step of calculating an SNR setpoint for the secondary channel comprises the steps of:

measuring the SNR setpoint of the associated primary channel;

obtaining a sector_offset value from a table based on measured transmitted power and power ratio measurements at subscriber locations;

modifying the sector_offset value based on a measured FER of the secondary channel obtaining a user_offset value based on FER measurements for the secondary channel and power ratio measurements at subscriber locations;

obtaining a rate_offset value; and summing the measured SNR setpoint of the corresponding primary channel with the modified sector_offset, the user_offset and the rate_offset.

* * * * *